United States Patent [19]
Ueda et al.

[11] Patent Number: 5,619,349
[45] Date of Patent: Apr. 8, 1997

[54] CRT CALIBRATION DEVICE FOR CALIBRATING DISPLAY COLOR OF A CRT TO A COLOR STANDARD

[75] Inventors: Masashi Ueda; Ryohei Komiya, both of Nagoya, Japan

[73] Assignee: Brother Kogyo Kabushiki Kaisha, Nagoya, Japan

[21] Appl. No.: 358,256

[22] Filed: Dec. 19, 1994

[30] Foreign Application Priority Data

Dec. 27, 1993 [JP] Japan ................................. 5-331539

[51] Int. Cl.⁶ ................................................ H04N 9/69
[52] U.S. Cl. ................................ 358/521; 358/515
[58] Field of Search .................... 358/504, 514–521, 358/296, 298; 355/77, 83, 88

[56] References Cited

U.S. PATENT DOCUMENTS

| | | | |
|---|---|---|---|
| 4,814,891 | 3/1989 | Uchiyama et al. | 358/521 |
| 4,959,711 | 9/1990 | Hung et al. | 358/80 |
| 4,967,283 | 10/1990 | Uchiyama et al. | 358/521 |
| 5,065,234 | 11/1991 | Hung et al. | 358/80 |
| 5,196,927 | 3/1993 | Warner | 358/515 |
| 5,245,419 | 9/1993 | Gu | 358/521 |
| 5,296,920 | 3/1994 | Sakaue et al. | 358/521 |
| 5,422,740 | 6/1995 | Fujimoto et al. | 358/521 |
| 5,426,517 | 6/1995 | Schwartz | 358/521 |

*Primary Examiner*—Stephen Brinich
*Attorney, Agent, or Firm*—Oliff & Berridge

[57] ABSTRACT

In a CRT calibration device, gradation signals of plural colors displayed on a CRT are determined in a gradation signal calculator based on a γ value input from a keyboard and data from a luminance value storage unit storing a plurality of relative luminance values on the CRT. If a user wants to correct the γ value while seeing the plural colors displayed on the CRT, he inputs a correct γ value through the keyboard.

18 Claims, 11 Drawing Sheets

Fig. 3B

| STEP S4 | CRT CALIBRATION |
|---|---|
| STEP S6 | INPUT γ VALUE FROM KEYBOARD |
| STEP S7 | READ DATA FROM LUMINANCE STORAGE AREA |
| STEP S8 | DETERMINE GRADATION SIGNAL VALUE FROM READ DATA |
| STEP S9 | DISPLAY CRT GRADATION |
| STEP S10 | DOES ANY DATA REMAIN IN LUMINANCE VALUE STORAGE AREA? |
| STEP S11 | DOES γ VALUE NEED TO BE RE-ADJUSTED? |
| STEP S12 | FORM COLOR CONVERSION LOOK-UP TABLE |
| STEP S13 | RETURN TO STEP S5 |

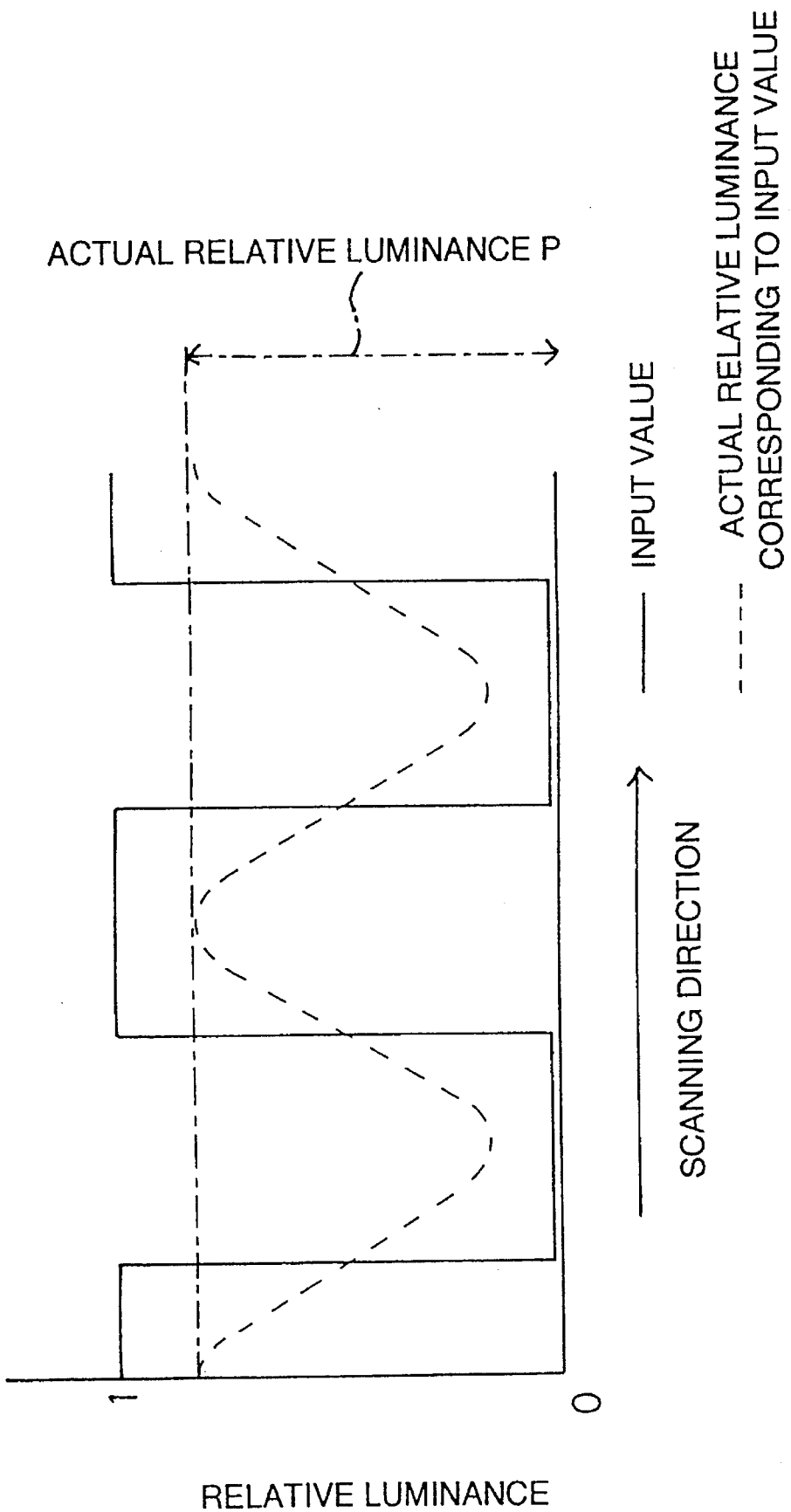

CRT CALIBRATION DEVICE FOR CALIBRATING DISPLAY COLOR OF A CRT TO A COLOR STANDARD

BACKGROUND OF THE INVENTION

1. Field of the Invention

This invention relates to a correction processing device for matching the luminescent color of a cathode-ray tube (CRT) to an external color standard, such as the print color of a printer, and particularly to a CRT calibration device for transmitting a signal representing the individual color reproduction characteristics of different CRTs to a printer.

2. Description of Related Art

There has been a remarkable difference in visual appearance between the luminescent color of a CRT and the print color of a color printer. This arises because of the difference in coloring principle and the difference in primary colors of these devices. Therefore, it is necessary to match the color of the CRT and the color of the printer with each other. However, the color reproduction characteristic differs greatly between different CRTs. Thus, a user must recognize the color reproduction characteristic of the CRT, when a color displayed on the CRT is to be accurately printed on a printer.

Red (R), green (G) and blue (B) are the three primary colors of a CRT. A gradation reproduction characteristic γ representing the relationship between the gradation signal value of each of the RGB color points is one factor for determining the color reproduction characteristic of the CRT. The gradation reproduction characteristic of the CRT can be approximated by Eq. 1:

$$V = (N/255)^\gamma \qquad (1)$$

where V is the relative luminance value with $0 \leq V \leq 1$ when the maximum luminance value is set to 1, N is the gradation signal value, where $0 \leq N \leq 255$, and γ is the gradation reproduction characteristic.

The γ value is representative of the gradation reproduction characteristic. The γ value can be calculated based on a gradation signal value B, where $0 \leq B \leq 255$, and a relative luminance value A, where $0 \leq A \leq 1$, by Eq. 2:

$$\gamma = \log(A)/\log(B/255) \qquad (2)$$

By supplying this γ value to the printer, the color output by the printer can be adjusted based on the gradation reproduction characteristic of the CRT. Therefore, a device for checking the γ value of each CRT is incorporated to the apparatus, and this device is called a CRT calibration device.

FIG. 9 shows one type of CRT calibration mechanism. A color patch A whose relative luminance value is known and a color patch B whose gradation signal value is adjustable by an user are displayed aligned with each other on a CRT to be calibrated. Thereafter, the gradation signal value of the color patch B is adjusted by the user until the color patch A and the color patch B appear to be the same color. That is, the color patches A and B become visually coincident with each other. The gradation signal value when these patches A and B look the same is indicated. Representing the relative luminance value of the color patch A and the gradation signal value of the color patch B when they appear visually coincident by VA and NB, respectively, the γ value is calculated according to Eq. 3:

$$\gamma = \log(VA)/\log(NB/255) \qquad (3)$$

The calculation of the relative luminance value of the color patch A is based on the following technical idea for area gradation. A black dot for which the gradation signal is set to "0" and a white dot for the gradation signal value is set to "255" are mixed with each other to calculate the relative luminance value. Now, representing the area (occupation) rate of the gradation signal value 255 by m and representing the relative luminance value of the gradation signal value 255 by P, Eq. 4 is satisfied:

$$VA = m \times P \qquad (4)$$

The gradation signal value 255 represents the maximum luminance value. Thus:

$$P = 1 \qquad (5)$$

Therefore, the relative luminance value of the color patch A is equal to m. Thus, it is a known value irrespective of the characteristic of each individual CRT. Therefore, the γ value can be obtained from Eq. 3.

When the color points of the gradation signals values of 0 and 255 are arranged at a high spatial frequency in a scanning direction on a CRT, the ability of the CRT to respond is lowered, and Eq. 5 (P=1) is not satisfied, as shown in FIG. 10. Therefore, the relative luminance value VA of Eq. 3 cannot be calculated. Thus, the γ value cannot be calculated.

On the other hand, a lateral-striped pattern as shown in FIG. 11 is considered as a method of lowering the spatial frequency of the black and the white in the scanning direction to solve this problem. However, this pattern is still recognized only as a lateral-striped pattern, so that it is difficult for an user to recognize this lateral-striped pattern as a uniform gray color. Therefore, it is difficult to match the colors of the color patches A and B with each other, and thus it is impossible to perform the color matching.

SUMMARY OF THE INVENTION

This invention provides a CRT calibration device capable of calibrating a gradation reproduction characteristic value (γ value), using a simple operation, to an external color standard.

This external color standard can be the printer colors of a printer, the display colors of another display device, such as another CRT, a color LCD display or the like, or a color standard stored in a memory.

In order to attain this and other objects, the CRT calibration device according to this invention includes input means for inputting a gradation reproduction characteristic value of a CRT, storage means for storing one or more relative luminance value of the CRT, determining means for determining a gradation signal value of the CRT based on the gradation reproduction characteristic value input by the input means and the relative luminance value stored in the storage means, and display control means for controlling a color display based on the gradation signal value determined by the determining means.

Further, the data stored in the storage means may comprise values indicating gradation of an achromatic color which varies from white to black. The data stored in the storage means may also comprise values for varying the gradation level of only one (or more than one) of the three primary colors (RGB) of the CRT. The data stored in the storage means may further comprise values representative of the gradation in at least one (or both) of a light portion and a dark portion of the gradation reproduction range displayable on the CRT.

The CRT calibration device may further include color conversion means for performing color conversion on image data displayed on the CRT when the image data are transmitted to a printer, another display device, or a memory, and color-conversion correcting means for correcting the color-conversion of the color conversion means based on the gradation reproduction characteristic input by the input means.

According to the CRT calibration device of this invention thus constructed, based on the gradation reproduction characteristic value input from the input means and the plurality of relative luminance values stored in the storage means, the gradation signal value indicating the gradation level of the CRT is determined by the determining means. Based on the plurality of gradation signal values determined by the determining means, a plurality of colors are displayed on the CRT by the display control means. The user inspects the plurality of colors which are displayed by the display control means, and determines if the gradation reproduction characteristic value should be corrected. If the gradation reproduction characteristic value needs to be corrected, the gradation reproduction characteristic value is again input from the input means to repeat the above processing. If no correction is required for the gradation reproduction characteristic value, the processing is ended.

Further, when the device includes the color conversion means for performing the colorconversion before transmitting the image data from the CRT to the printer, the other display or the memory, the color conversion by the color conversion means is corrected in the color conversion correcting means.

BRIEF DESCRIPTION OF THE DRAWINGS

The preferred embodiments of this invention will be described in detail, with reference to the following figures, wherein:

FIGS. 3A and 3B are a flowchart outlining in greater detail the operation of the CRT calibration step of the flowchart of FIG. 2;

FIG. 10 is a graph showing the luminance of a CRT in the prior art; and

DETAILED DESCRIPTION OF THE PREFERRED EMBODIMENT

Figure 1:
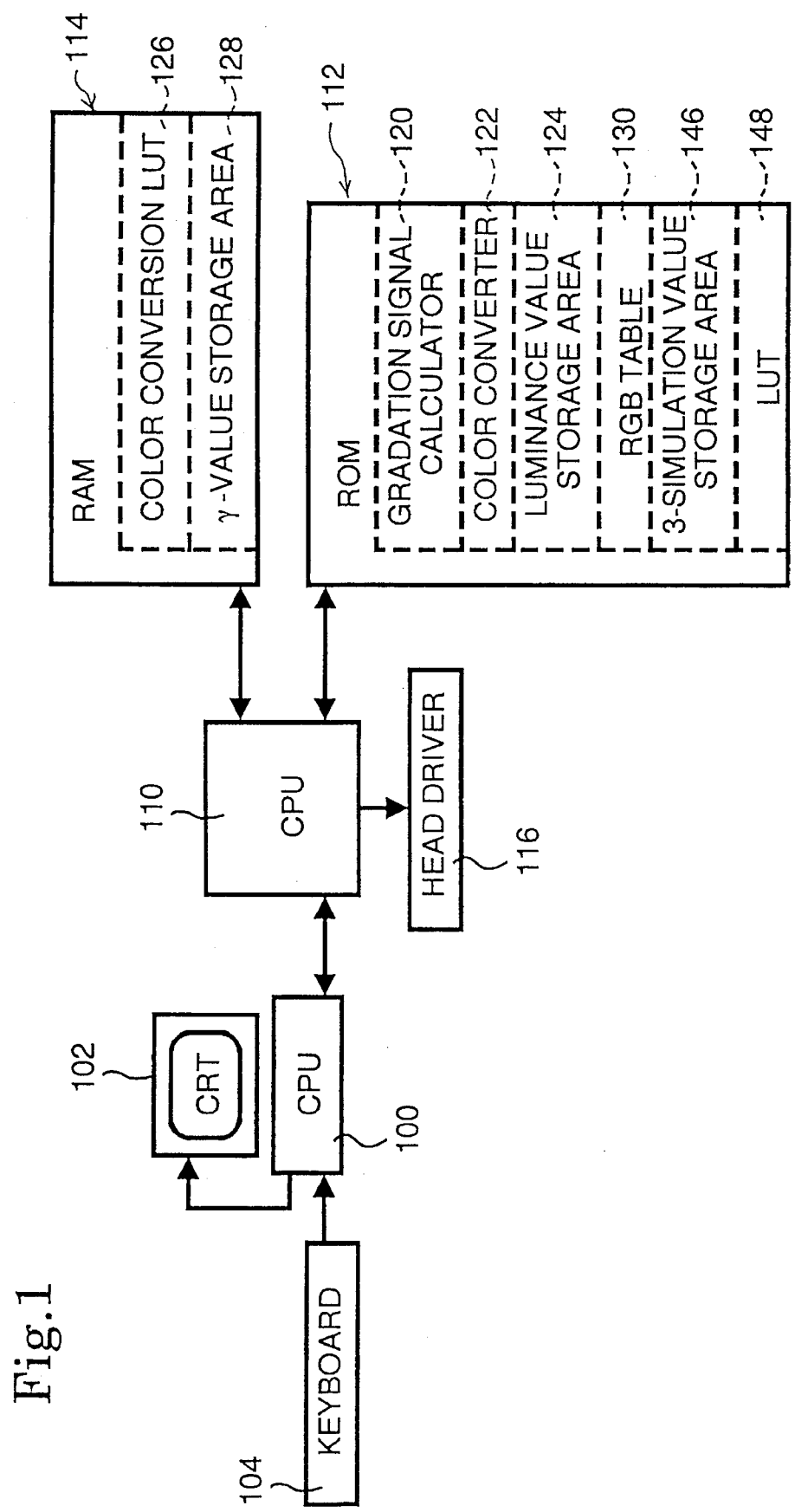
FIG. 1 is a block diagram showing a preferred embodiment of a CRT calibration device according to this invention.

As shown in FIG. 1, a first CPU 100 is connected to a CRT 102 and a keyboard 104. A second CPU 110 communicates with the first CPU 100. The second CPU 110 is connected to a head driver 116. A ROM 112 and a RAM 114 are provided outside of the second CPU 110. The ROM 112 and the RAM 114 provided data to the second CPU 110. A gradation signal calculator 120, a color converter 122, a luminance value storage area 124, an RGB table 130, a 3-simulation value storage area 146, and a look-up table (LUT) 148 are provided in the ROM 112. A color-conversion look-up table (LUT) 126 and a γ-value storage area 128 are provided in the RAM 114.

In the preferred embodiment, the gradation signal calculator 120 is a gradation signal calculation program stored in the ROM 112. Similarly, in the preferred embodiment, the color converter 122 is a color conversion program stored in the ROM 112. However, the gradation signal calculator 120 and the color converter 122 can be implemented in any known hardware device using any known implementation method. In particular, the gradation signal calculator 120 and/or the color converter 122 can be implemented in a look-up table, an application-specific integrated circuit (ASIC), a programmable logic array, a programmable gate array, or the like.

Figure 2:
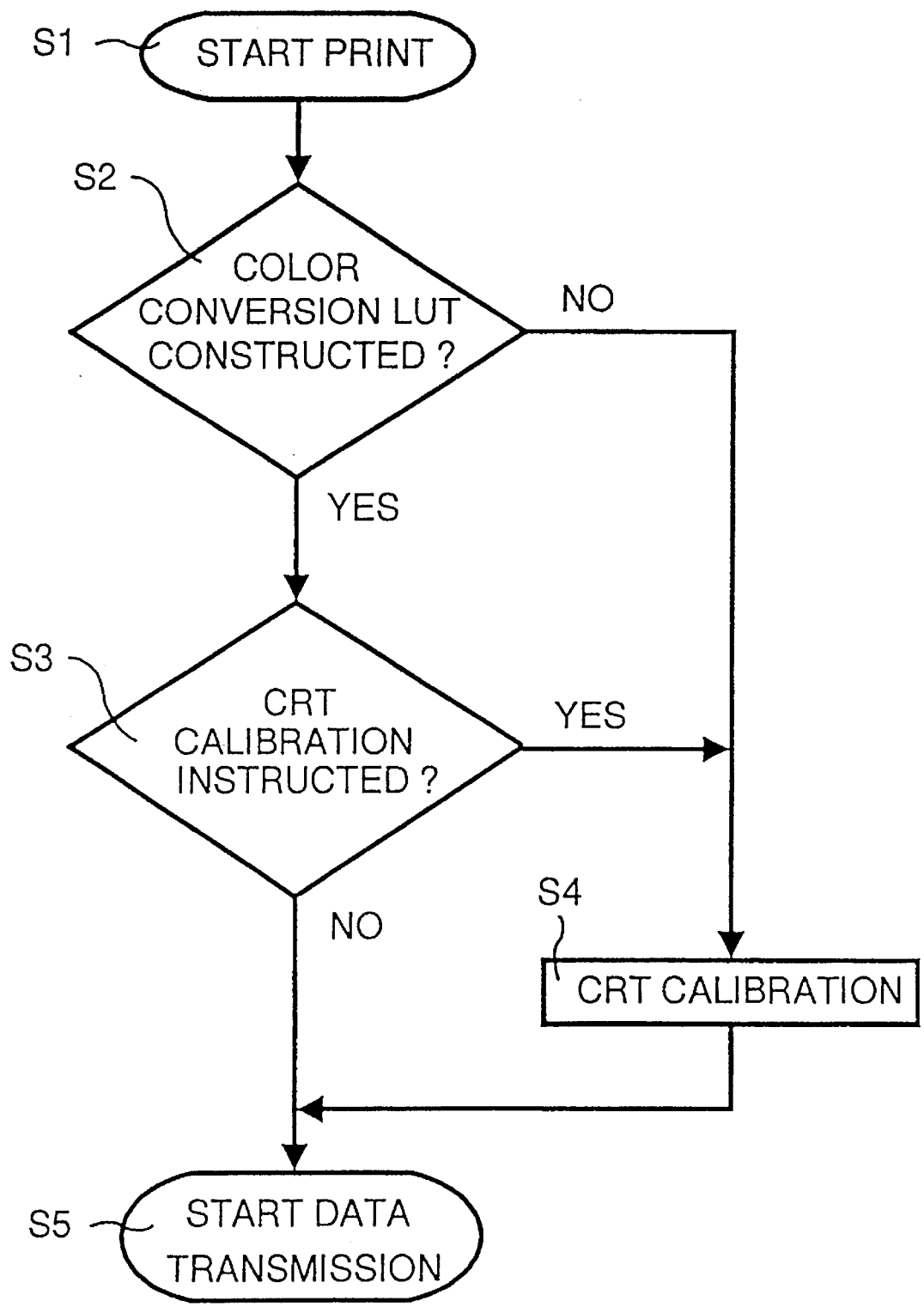
FIG. 2 is a flowchart outlining the operation of the CRT calibration device shown in FIG. 1.

As shown in the flow chart of FIG. 2, the CRT calibration process starts in step S1, when a start print command is received. In response to the start print command, control continues to step S2. In step S2, when a print instruction is supplied by the first CPU 100 to the second CPU 110, the second CPU 110 determines whether color conversion data is present in the color-conversion LUT 126 of the RAM 114. If color conversion data is present in the color conversion LUT, control continues to step S3. Otherwise, if no color conversion data is present in the color-conversion LUT 126, control jumps to step S4. In step S3, the second CPU 110 determines, based on commands received from the first CPU 100, whether CRT calibration is to be executed. If the response input from the keyboard 104 through the first CPU 100 is "no execution of CRT calibration", control jumps to step S5. In step S5, transmission of the data is started. Otherwise, if the CRT calibration process is to be executed, control continues to step S4. In step S4, the CRT calibration process is performed. Control then continues to step S5.

Figure 3A:
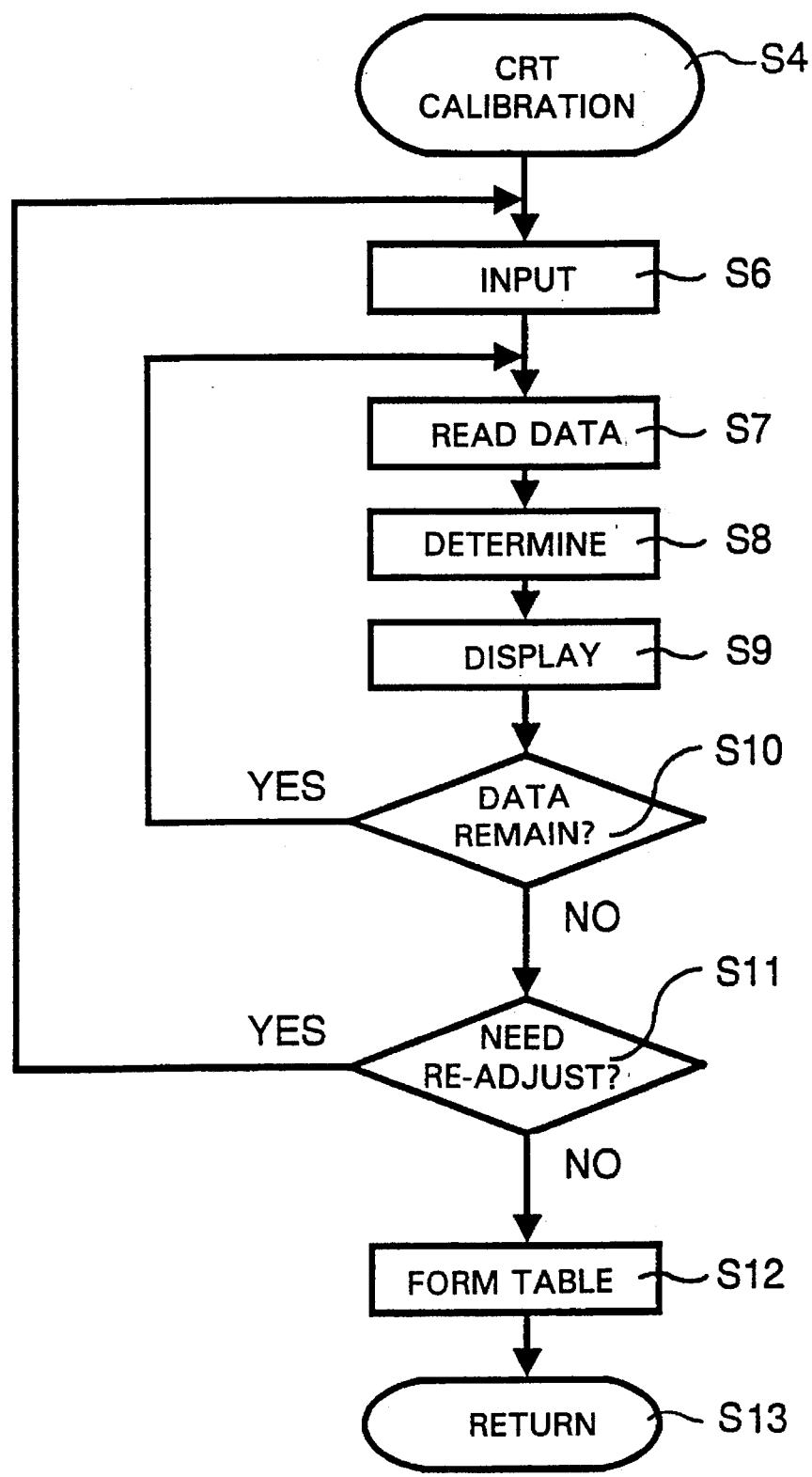

FIGS. 3A and 3B show in greater detail the CRT calibration process of step S4. Upon execution of the CRT calibration process in step S4, in step S6, the second CPU 110 requests the γ value from the first CPU 100. The first CPU 100 returns the γ value input through the keyboard 104 to the second CPU 110. The second CPU 110 stores the input γ value into the γ-value storage area 128. Next, in step S7, the second CPU 110 reads out data stored in the luminance value storage area 124 and the γ value storage area 128. The second CPU 110 supplies the read data to the gradation signal calculator 120. Then, in step S8, the gradation signal calculator 120 determines a gradation signal value according to Eq. 6:

$$N = 255(V^{-\gamma}) \quad (6)$$

where V is the data obtained from luminance storage area 124, with $0 \leq V \leq 1$; γ is the data obtained from the γ-value storage unit 128; and N is the gradation signal value, with $0 \leq N \leq 255$.

The gradation signal value determined in the gradation signal calculator 120 is transmitted to the first CPU 100. Then, in step S9, the color corresponding to the gradation signal value N is displayed on the CRT 102.

Next, in step S10, the second CPU 110 determines whether all the data has been read out from the luminance value storage area 124. If all the data stored in the luminance value storage area 124 has not been read out, control jumps back to step S7, and the data read, gradation signal value determination and display steps, steps S7–S9, are repeated until all the data in the luminance value storage area 124 has been read out. Once all the data has been read out, control continues to step S11, where the second CPU 110 determines if the γ value must be readjusted. The second CPU 110 inputs an inquiry to the first CPU 100, which returns to the second CPU 110 the positive or negative response input by the user through the keyboard 104. If, in step S11, the γ value needs to be readjusted, control jumps back to step S6. Otherwise, in step S11, if no correction needs to be made to the γ value, control continues to step S12. In step S12, the second CPU 110 reads out the data stored in the γ-value storage unit 128 to construct the color conversion LUT 126. Then, control continues to step S13, which finishes the CRT calibration by returning control to step S5.

Next, the data structure stored in the luminance value storage area 124 will be described with reference to FIG. 4. The CIE1976L*a*b* is a scale for indicating a color as an absolute value. It is formed so that the distance on the scale is equal to the color difference to which human eyes are sensitive. The relationship between CIE1976L*a*b* and the relative luminance value V can be represented by the following equation. L* is an axis representing brightness, as set forth in Eq. 7:

$$L^* \approx 100(V^{1/3}) \quad (7)$$

where $0 \leq L^* \leq 100$, and the brightness becomes lighter as the value of L* becomes larger; and V is the relative luminance value, with $0 \leq V \leq 1$.

Figure 4:
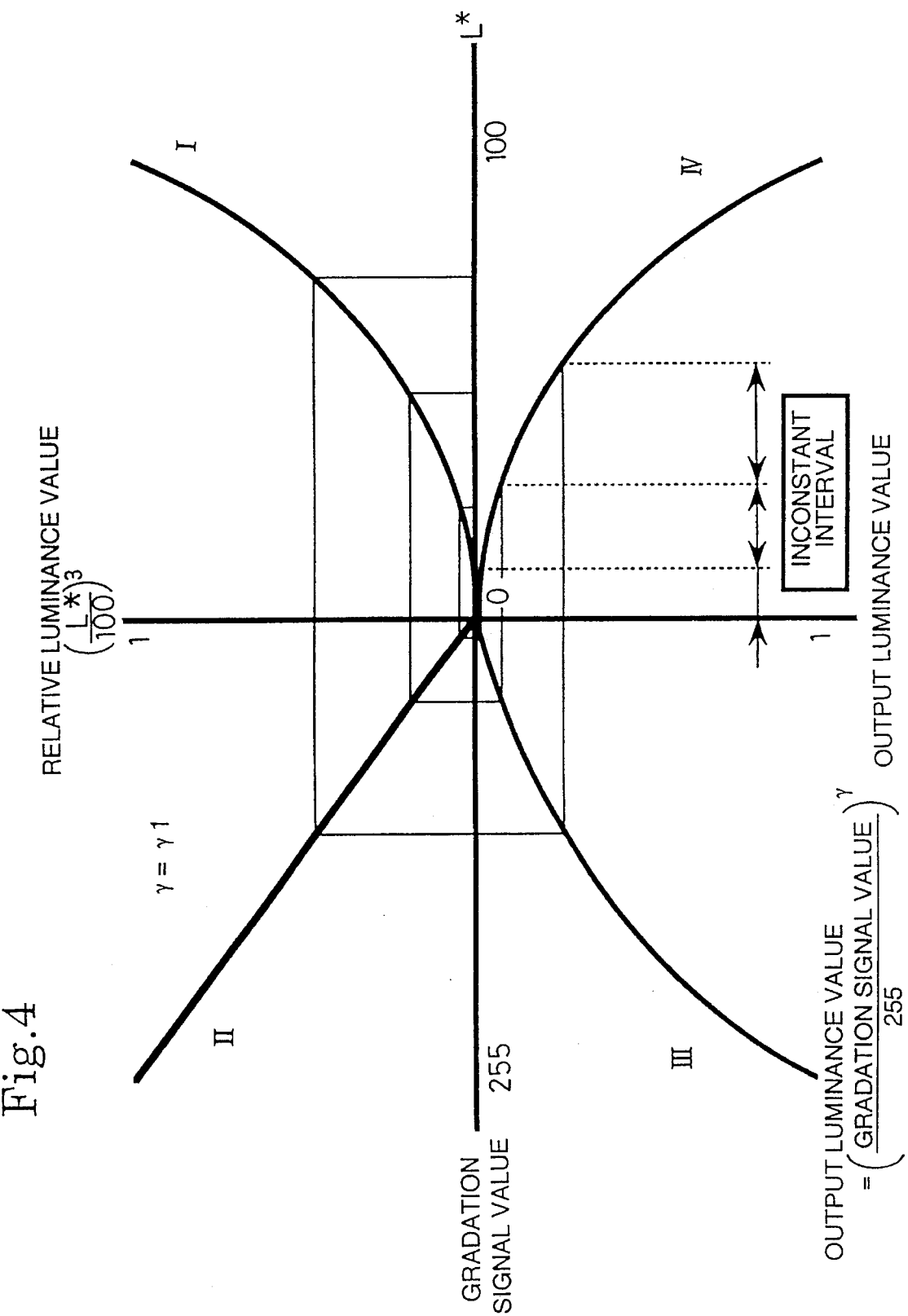
FIG. 4 is graph showing a gradation reproduction characteristic when a γ value set by an user is different from an actual CRT gradation reproduction characteristic in the embodiment.

The data stored in the luminance value storage area 124 are selected so that the values of L* obtained by Eq. 7 are arranged at a constant interval, as shown in the first quadrant of the graph shown in FIG. 4.

The data stored in the luminance value storage unit 124 are converted to gradation signal values with the γ-value set by the user and stored in the γ-value storing means 128, according to Eq. 8; which is shown in the second quadrant of the graph shown in FIG. 4:

$$N=255 \, (V^{\gamma 1}) \quad (8)$$

where N is the gradation signal value, with $0 \leq N \leq 255$; and γ (γ1) is the first γ value set by the user.

By displaying these gradation signals on the CRT 102, the gradation can be reproduced on the basis of the actual CRT gradation reproduction characteristic, which is shown in the third quadrant of the graph shown in FIG. 4. At this time, since the unknown actual CRT gradation reproduction characteristic is different from the gradation reproduction characteristic determined from the first γ (γ1) value set by the user (i.e., when the second and third quadrants of FIG. 4 are asymmetric relative to each other with respect to the abscissa of FIG. 4), the gradation displayed on the CRT 102 is not visually expressed as uniformly varying. Thus, the gradation is concentrated to one of the light portion or dark portion, as shown in the fourth quadrant of the graph shown in FIG. 4.

Figure 5:
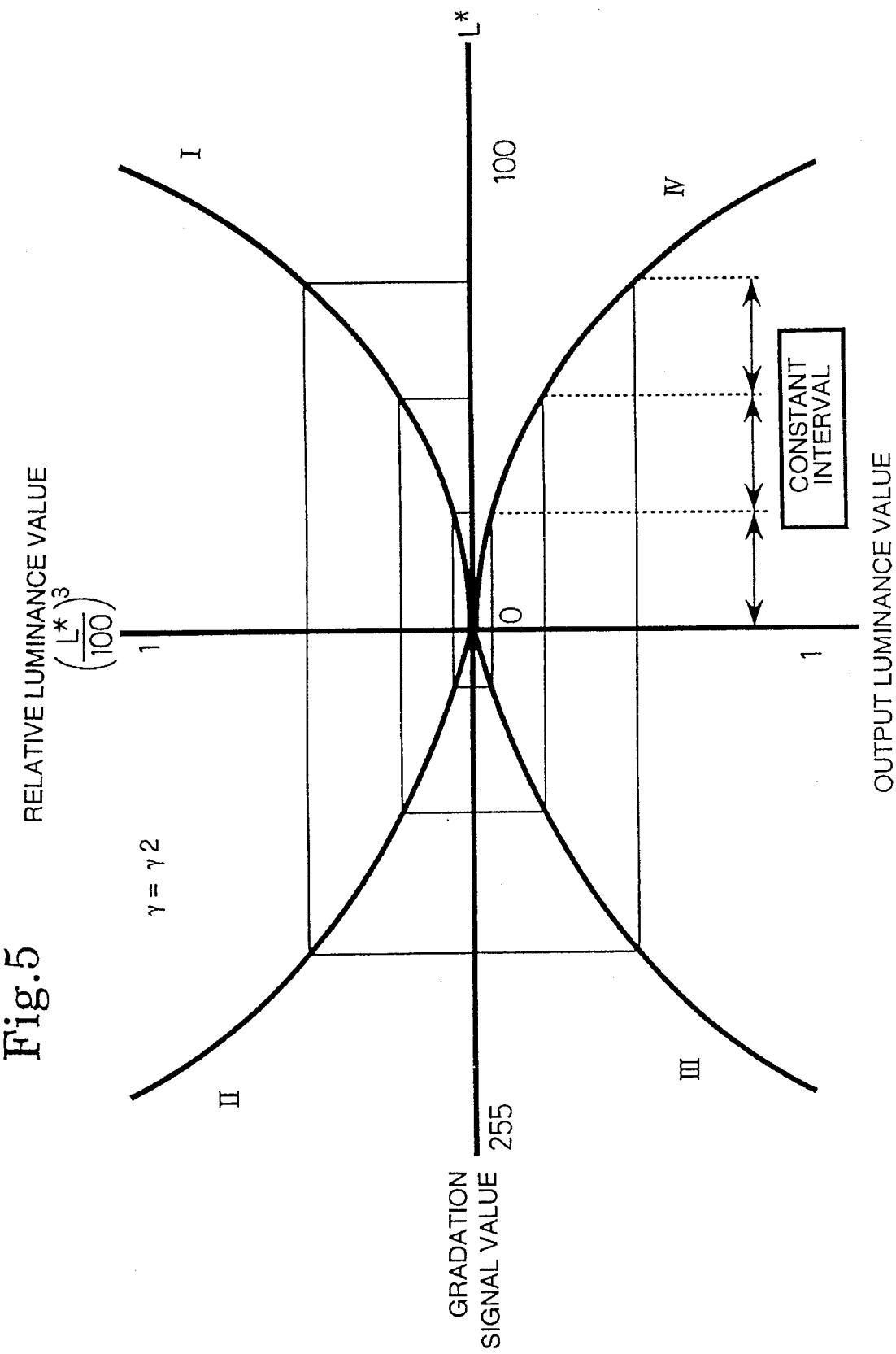
FIG. 5 is a graph showing the gradation reproduction characteristic when the γ value set by the user is approximately equal to the actual CRT gradation characteristic.

On the other hand, when the actual CRT gradation reproduction characteristic approximately equals the gradation reproduction characteristic represented by the second γ (γ2) value set by the user, the user sees that the gradation varies substantially uniformly. That is, by adjusting the γ value so that the gradation displayed on the CRT 104 varies uniformly, the actual CRT gradation reproduction characteristic can be approximated. This is shown in the graph shown in FIG. 5.

Figure 6:
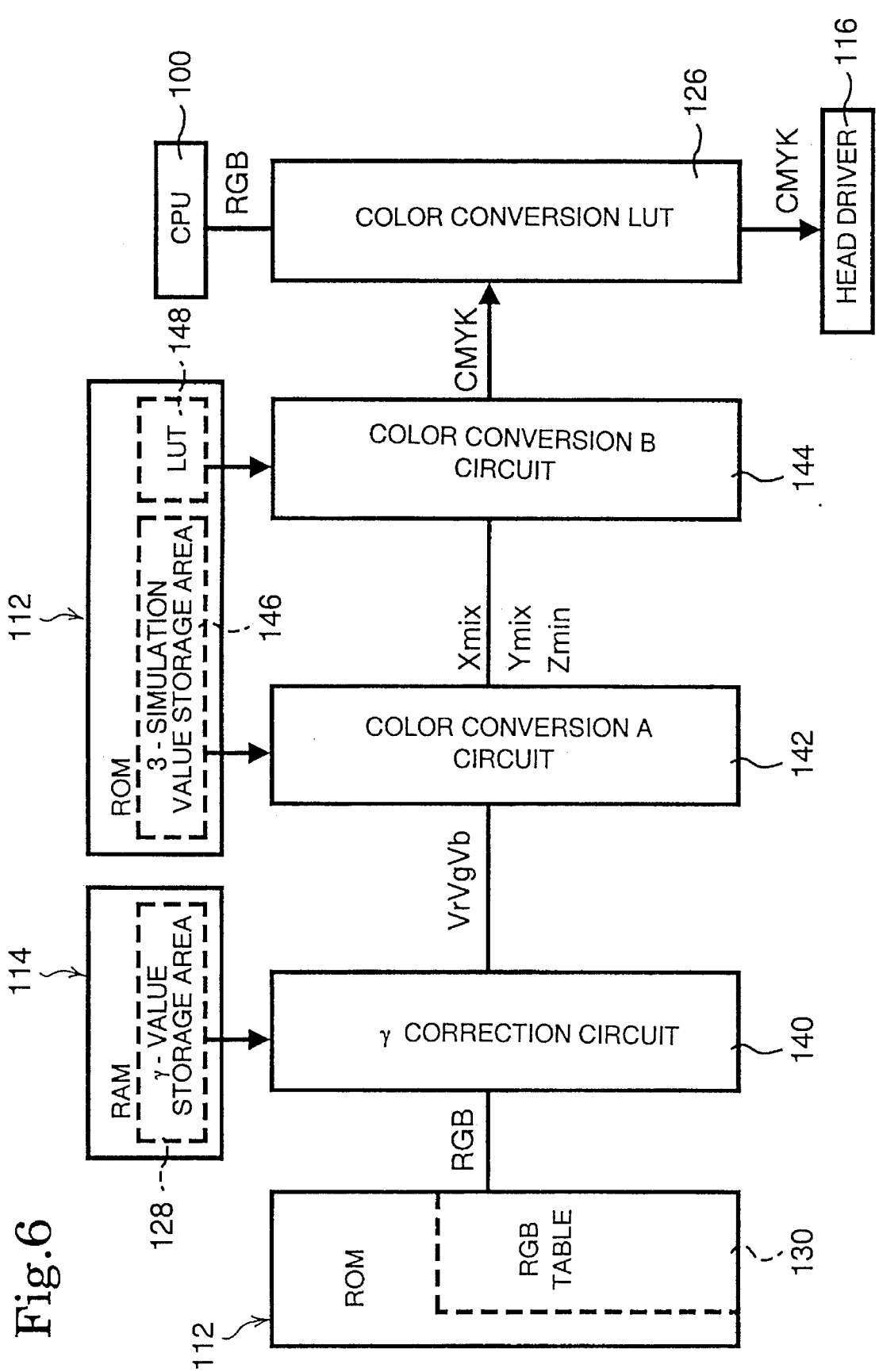
FIG. 6 is a block diagram showing a constructing process of a color conversion device.

Next, a method for constructing the color conversion LUT 126 for performing color conversion using the obtained γ correction value will be described. The respective CIE1931XYZ values (hereinafter referred to as the XYZ values) for the three additive primaries (RGB) of the CRT are represented, respectively, by (Xr, Yr, Zr), (Xg, Yg, Zg) and (Xb, Yb, Zb). The color values of these primaries vary with each individual CRT. However, it is expected that these color values are more stable (i.e., vary less) than the γ value described above. Thus, the effect of the variation of these color values on the color reproduction is small, even if such fixed values are used. In this embodiment, an example using these fixed values will be described with reference to FIG. 6.

The RGB value table 130 is provided in the ROM 112. The RGB value table 130 includes three values which express the gradation signal value of each primary color. It is constructed by a combination of data which are extracted at any equi-interval from a RGB gradation signal value ranging from 0 to 255.

First, one data combination is read out from the RGB value table 130 to calculate, based on Eq. 1, the relative luminance values Vr, Vg and Vb, where $0 \leq Vr, Vg, Vb \leq 1$. The relative luminance values are determined by the "γ correction" circuit 140. The γ value used is that stored in the γ-value storage area 128. The XYZ values of the three primaries, as described above, are stored in the 3-simulation value storage area 146 provided in the ROM 112.

The XYZ value of a color which is obtained by color-mixing the luminance values Vr, Vg and Vb is calculated by the following matrix equation Eq. 9:

$$\begin{bmatrix} Xmix \\ Ymix \\ Zmix \end{bmatrix} = \begin{bmatrix} Xr & Xg & Xb \\ Yr & Yg & Yb \\ Zr & Zg & Zb \end{bmatrix} \times \begin{bmatrix} Vr \\ Vg \\ Vb \end{bmatrix}$$

Xmix, Ymix, Zmix represent the XYZ values of a color reproduced through the color mixing. This color mixing is performed by the "color conversion A" circuit 142.

In the preferred embodiment, where the system with the CRT 102 and the CRT calibration device is connected to a printer, the XYZ values are converted to the cyan, magenta, yellow, and black (CMYK) values, which are the gradation signals for a printer, by a direct map method using the lookup table (LUT) 148. This mapping is performed by the "color conversion B" circuit 144. This direct mapping method is a publicly known technique disclosed in U.S. Pat. No. 4,959,711 and U.S. Pat. No. 5,065,234, the disclosures of which are incorporated herein by reference. Thus, the detailed description of this mapping method is omitted. The LUT 126 is provided in the RAM 114.

However, if the CRT 102 and CRT calibration device are to calibrate the display colors of the CRT 102 to some other color standard, the look-up table 148 will store values for converting the XYZ values of the CRT to this other color standard. Examples of other color standards include those for other printers, such as 3-color printers, ink jet printers, laser printers, thermal wax printers and the like; for other display devices, such as other types of CRTs, color LCD displays, and the like; and for arbitrary color standards, that are, for example, stored in a memory. Accordingly, in a further embodiment of the LUT 148, the LUT 148 will have a number of different tables, each table for one type of color standard to which the CRT calibration device provides color conversion.

The determined CMYK values are transmitted to the color conversion LUT 126, where they are stored. Through this operation, the color conversion LUT 126, which defines the correspondence between the RGB values corresponding to a gradation signal of any CRT and the CMYK values corresponding to a gradation signal of a printer, can be constructed.

Image data transmitted from the first CPU 100 is converted to a CMYK printer gradation signal by the direct mapping method using the color conversion LUT 126 as described above. The CMYK printer gradation signal is then transmitted to the head driver 116.

Figure 7:
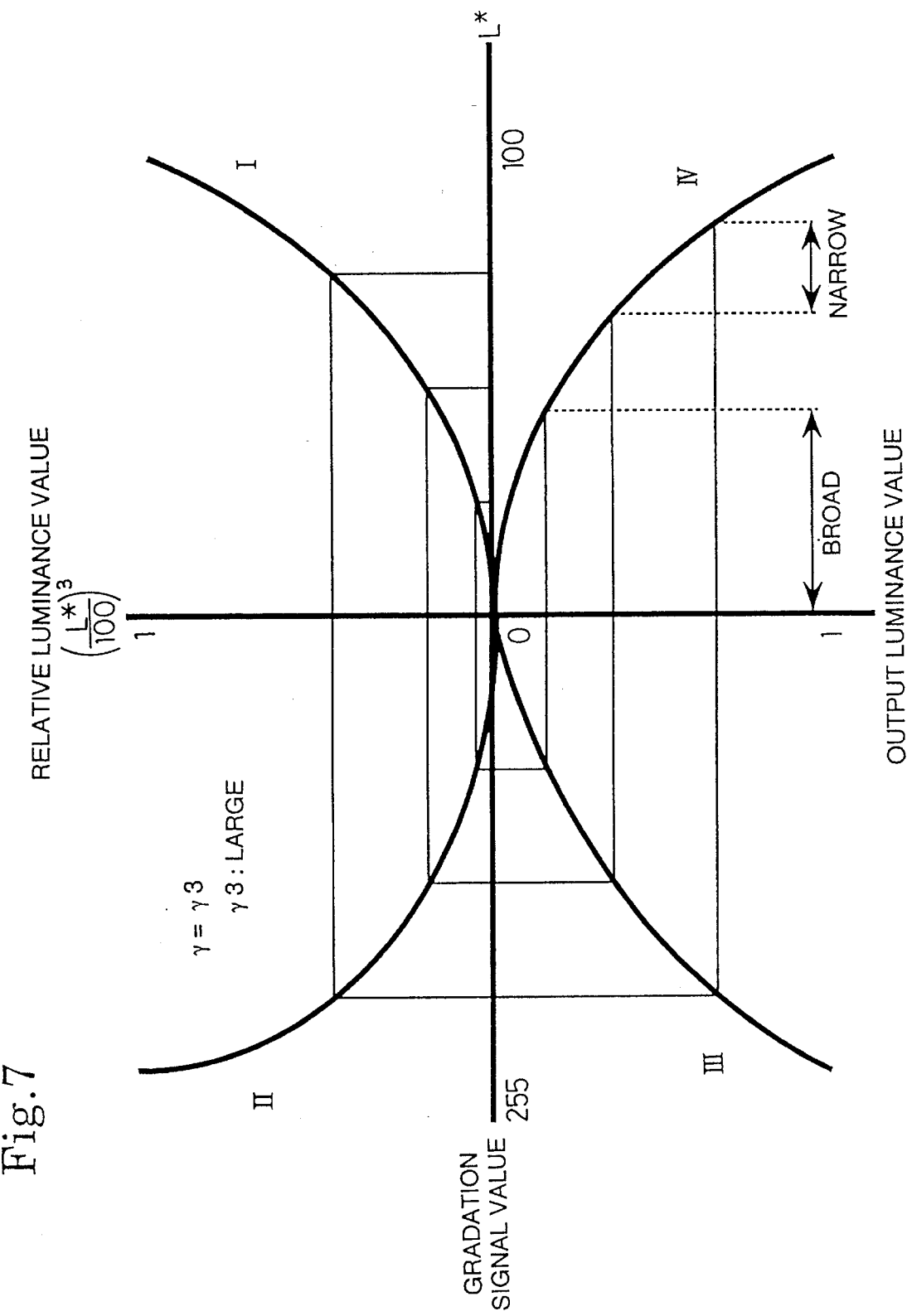
FIG. 7 is a graph showing the gradation reproduction characteristic when the γ value set by the user is larger than the actual CRT gradation reproduction characteristic in the embodiment.
Figure 8:
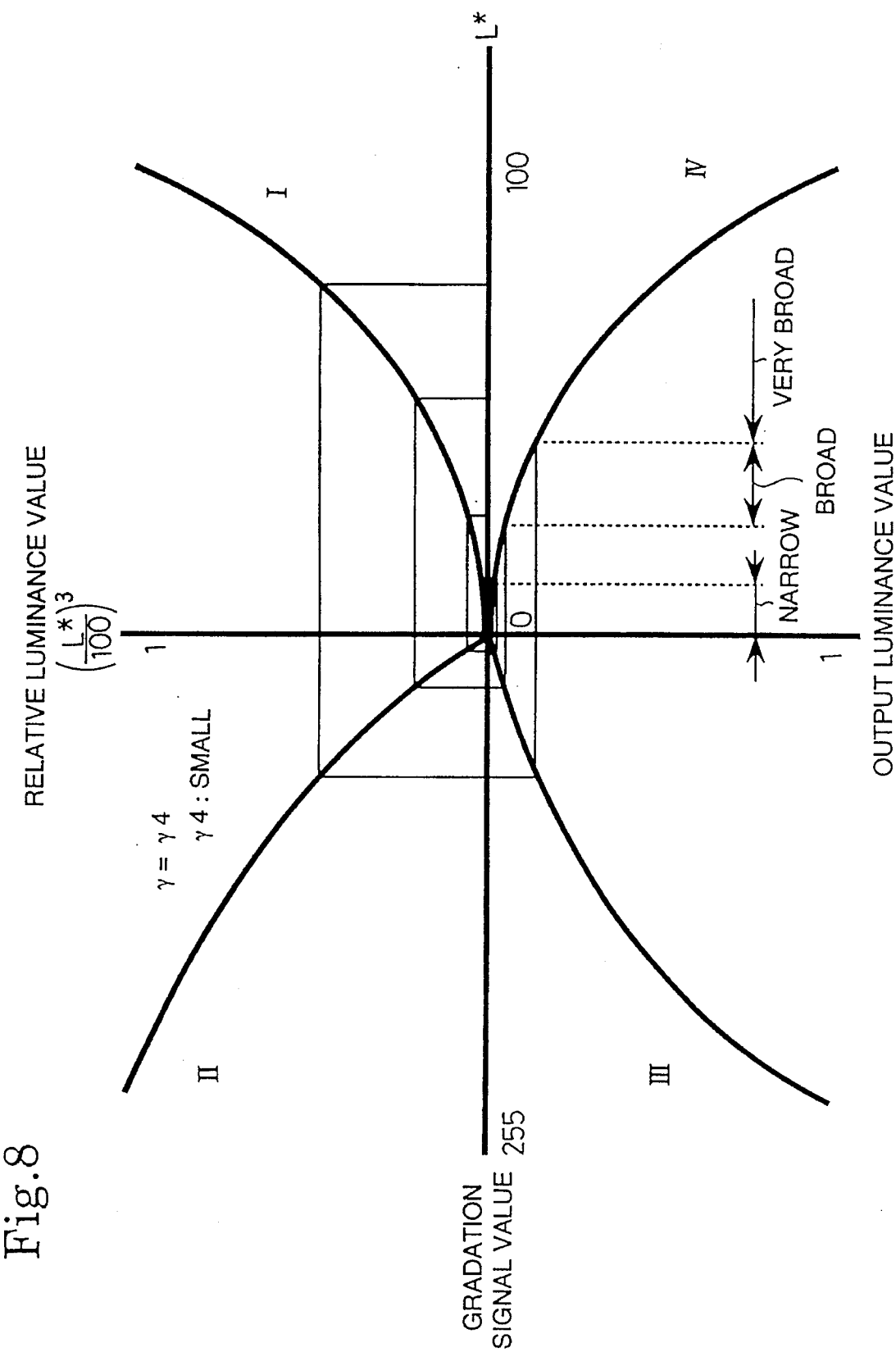
FIG. 8 is a graph showing the gradation reproduction characteristic when the γ value set by the user is smaller than the actual CRT gradation reproduction characteristic in the embodiment.
Figure 9:
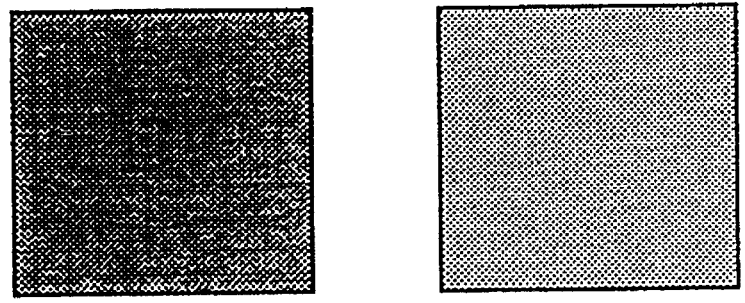
FIG. 9 is a diagram showing a first color patch used in a conventional CRT calibration device.
Figure 11:
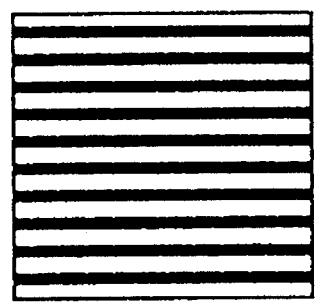
FIG. 11 shows a lateral-striped pattern.

Next, another data structure of the luminance value storage area 124 will be described. As shown in FIGS. 7 and 8, when the user sets a γ (γ3) value which is larger than the actual CRT gradation reproduction characteristic, the gradation difference in the light portion becomes smaller, as shown in the fourth quadrant of the graph shown in FIG. 7. On the other hand, when the user sets a γ (γ4) value which is smaller than the actual CRT gradation reproduction characteristic, the gradation difference in the dark portion becomes smaller, as shown in the fourth quadrant of the graph shown in FIG. 8. As described above, by estimating only the gradation reproduction in the light and dark portions, it can be determined whether the γ value is proper or not. Therefore, the entire area of the gradation reproduction range is not required to be displayed on the CRT 102. Accordingly, the same effect is expected even if one or both of the at least two gradation areas, i.e. the light and dark portions, are displayed and the γ value is adjusted so that the excellent gradation reproduction can be performed based on one or both of these gradation areas.

As described above, according to the CRT calibration device of this invention, the gradation reproduction characteristic of an individual CRT can be obtained with a simple operation, so that the proper color matching can be performed between the CRT and the printer. Therefore, a user can accurately print a color while paying attention to only the color displayed on the CRT. Thus, it is unnecessary for the user to pay attention to the color reproduction characteristic of the printer, so that the user can use the printer more conveniently and effectively.

As many apparently different embodiments of this invention may be made without departing from the spirit and scope thereof, it is to be understood that the invention is not limited to the specific embodiments thereof except as defined in the appended claims.

What is claimed is:

1. A CRT calibration device for calibrating display colors of a CRT to a color standard, the device comprising:

input means for inputting a gradation reproduction characteristic value of the CRT;

storage means for storing relative luminance data of the CRT;

determining means for determining a gradation signal value of the CRT based on the gradation reproduction characteristic value input by said input means and the relative luminance data stored in said storage means; and display control means for controlling a color display based on the gradation signal value determined by said determining means, the color display indicating when an actual CRT gradation reproduction characteristic value approximately equals the gradation reproduction characteristic value input by said input means.

2. The CRT calibration device of claim 1, wherein the data stored in said storage means comprises values indicating a gradation of an achromatic color which varies from white to black.

3. The CRT calibration device of claim 1, wherein the data stored in said storage means comprises values for varying a gradation level of at least one of a plurality of primary colors of the CRT.

4. The CRT calibration device of claim 1, wherein the data stored in said storage means comprises values representative of a gradation in at least one of a light portion and a dark portion of a gradation reproduction range displayable on the CRT.

5. The CRT calibration device of claim 4, wherein the data stored in said storage means comprises values representative of the gradation in both the light portion and the dark portion of the gradation reproduction range displayable on the CRT.

6. The CRT calibration device of claim 1, further including:

color conversion means for performing color conversion on image data displayed on the CRT based on the color standard; and color-conversion correcting means for correcting the color-conversion of said color conversion means based on the gradation reproduction characteristic input by said input means.

7. A CRT calibration device for calibrating display colors of a CRT to a color standard, the device comprising:

an input device inputting a gradation reproduction characteristic value of the CRT;

a memory storing relative luminance data of the CRT;

a gradation signal calculator determines a gradation signal value of the CRT based on the gradation reproduction characteristic value input by said input device and the relative luminance data stored in said memory; and a display controller controlling a color display based on the gradation signal value generated by said gradation signal generator, the color display indicating when an actual CRT gradation reproduction characteristic value approximately equals the gradation reproduction characteristic value input by said input device.

8. The CRT calibration device of claim 7, wherein the data stored in said memory comprises values indicating a gradation of an achromatic color which varies from white to black.

9. The CRT calibration device of claim 7, wherein the data stored in said memory comprises values for varying a gradation level of at least one of a plurality of primary colors of the CRT.

10. The CRT calibration device of claim 7, wherein the data stored in said memory comprises values representative of a gradation in at least one of a light portion and a dark portion of a gradation reproduction range displayable on the CRT.

11. The CRT calibration device of claim 10, wherein the data stored in said memory comprises values representative of the gradation in both the light portion and the dark portion of the gradation reproduction range displayable on the CRT.

12. The CRT calibration device of claim 7, further including:
- a color converter converting color of image data displayed on the CRT when the image data are transmitted to a printer; and
- a color-conversion corrector correcting the color-conversion of said color converter based on the gradation reproduction characteristic input by said input device.

13. A method for calibrating display colors of a CRT to a color standard, the method comprising the steps of:
- inputting a gradation reproduction characteristic value of the CRT;
- storing relative luminance data of the CRT;
- determining a gradation signal value of the CRT based on the input gradation reproduction characteristic value and the stored relative luminance data; and
- controlling a color display based on the determined gradation signal value, the color display indicating when an actual CRT gradation reproduction characteristic value approximately equals the input gradation reproduction characteristic value.

14. The CRT calibration method of claim 13, wherein the stored at least one relative luminance value comprises values indicating a gradation of an achromatic color which varies from white to black.

15. The CRT calibration method of claim 13, wherein the stored at least one relative luminance value comprises values for varying a gradation level of at least one of a plurality of primary colors of the CRT.

16. The CRT calibration device of claim 13, wherein the stored at least one relative luminance value comprises values representative of a gradation in at least one of a light portion and a dark portion of a gradation reproduction range displayable on the CRT.

17. The CRT calibration method of claim 13, further comprising the steps of:
- performing color conversion on image data displayed on the CRT based on the color standard; and
- correcting the color-conversion of said color conversion means based on the input gradation reproduction characteristic.

18. The CRT calibration method of claim 17, further comprising the step of transmitting the image data to one of a printer, another display device, and a memory.

* * * * *